United States Patent
Robinson et al.

(10) Patent No.: US 10,788,583 B2
(45) Date of Patent: Sep. 29, 2020

(54) RAPID ROBUST DETECTION DECREASER

(71) Applicant: RAYTHEON COMPANY, Waltham, MA (US)

(72) Inventors: Ian S. Robinson, Redondo Beach, CA (US); Nicholas J. Ploplys, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 417 days.

(21) Appl. No.: 15/785,300

(22) Filed: Oct. 16, 2017

(65) Prior Publication Data

US 2019/0113624 A1  Apr. 18, 2019

(51) Int. Cl.
| | |
|---|---|
| *G01C 3/08* | (2006.01) |
| *G01S 17/66* | (2006.01) |
| *G01S 13/72* | (2006.01) |
| *G01S 13/86* | (2006.01) |
| *G01S 7/292* | (2006.01) |
| *G01S 7/51* | (2006.01) |
| *G01S 7/06* | (2006.01) |

(52) U.S. Cl.
CPC ............ *G01S 17/66* (2013.01); *G01S 7/2922* (2013.01); *G01S 13/72* (2013.01); *G01S 13/726* (2013.01); *G01S 13/86* (2013.01); *G01S 13/867* (2013.01); *G01S 7/06* (2013.01); *G01S 7/51* (2013.01)

(58) Field of Classification Search
None
See application file for complete search history.

(56) References Cited

U.S. PATENT DOCUMENTS

| | | | | |
|---|---|---|---|---|
| 3,387,300 A | * | 6/1968 | Blitz | G01S 13/66 342/95 |
| 5,341,142 A | * | 8/1994 | Reis | F41G 7/2226 244/3.15 |
| 8,416,123 B1 | | 4/2013 | Mitchell et al. | |

(Continued)

FOREIGN PATENT DOCUMENTS

IL  181820 B  3/2011

OTHER PUBLICATIONS

Sanchez-Matilla, Ricardo et al., "Online Multi-target Tracking with Strong and Weak Detections", Nov. 3, 2016, Medical Image Computing and Computer-Assisted Intervention—MICCAI 2015, 18th International Conference, Munich, Germany, Oct. 5-9, 2015, Springer International Publishing, Switzerland (pp. 84-99).

(Continued)

*Primary Examiner* — Isam A Alsomiri
*Assistant Examiner* — Amir J Askarian
(74) *Attorney, Agent, or Firm* — Lewis Roca Rothgerber Christie LLP

(57) ABSTRACT

A system for tracking targets. A sequence of sensor observations is processed with two thresholds, including a first threshold, and a second threshold, higher than the first threshold. Signals that exceed the first threshold are identified as low-confidence target detections and stored for possible future use. When a signal exceeds the higher second threshold, it is identified as a high-confidence detection, and one or more candidate tracks are formed, including the high-confidence detection and one or more low-confidence detections from within a neighborhood of the high-confidence detection.

19 Claims, 3 Drawing Sheets

(56) References Cited

U.S. PATENT DOCUMENTS

| | | | | |
|---|---|---|---|---|
| 2002/0071126 | A1* | 6/2002 | Shirai | G01S 17/42 |
| | | | | 356/614 |
| 2016/0080709 | A1* | 3/2016 | Viswanathan | H04N 9/3129 |
| | | | | 353/85 |
| 2016/0097839 | A1* | 4/2016 | Fox | G01S 7/2922 |
| | | | | 342/52 |
| 2017/0328990 | A1* | 11/2017 | Magee | G01S 7/4817 |
| 2017/0356981 | A1* | 12/2017 | Yang | G01S 7/4868 |
| 2018/0203116 | A1* | 7/2018 | Sugimoto | G01S 7/4865 |
| 2018/0341009 | A1* | 11/2018 | Niclass | G01S 7/4816 |
| 2019/0324124 | A1* | 10/2019 | O'Keeffe | G01S 17/89 |

OTHER PUBLICATIONS

International Search Report for corresponding International Application No. PCT/US2018/045786, filed Aug. 8, 2018, International Search Report dated Oct. 30, 2018 and dated Nov. 8, 2018 (5 pgs.).
Written Opinion of the International Searching Authority for corresponding International Application No. PCT/US2018/045786, filed Aug. 8, 2018, Written Opinion of the International Searching Authority dated Nov. 8, 2018 (8 pgs.).

* cited by examiner

RAPID ROBUST DETECTION DECREASER

FIELD

One or more aspects of embodiments according to the present invention relate to target tracking, and more particularly to a system and method for rapidly acquiring a high-quality target track.

BACKGROUND

A tracking sensor such as a radar system or an electro-optical sensor may, in operation, produce a sensor output signal that contains a combination of signals from targets of interest, clutter (e.g., signals from terrain features that are not of interest), and noise. A threshold may be set, in a processing circuit receiving data from the sensor. When the sensor output signal exceeds the threshold, the signal may be classified as a detection of a target; otherwise, the signal may be discarded, and not processed further. Each new frame (e.g., of an electro-optical sensor) or dwell (e.g., of a radar sensor) may result in a new set of detections. A target tracker may associate detections in a sequence of frames (or dwells) to estimate target motion. With each new frame or dwell, new detections aligned with prior estimates of target motion may be added to the track. The estimated error (or uncertainty) in each candidate target track may change, usually decreasing, as additional detections are added to the track. Tracks for which new detections are not available may be abandoned and once tracks for which the error estimate is low may be deemed to be actual tracks and are then reported. As weapons may be aimed at reported tracks it is very important to strictly limit the number of false tracks that are reported.

If the detection threshold is set high, then the probability of false alarm (i.e., the probability that a signal classified as a detection was in fact caused by noise or clutter) is reduced, but the probability of detection (i.e., the likelihood that a true signal from a target is classified as a detection) is also decreased, increasing the risk that a real target may go undetected, or delaying the formation of a reported track. If the threshold is set low then both the probability of false alarm and the probability of detection are increased. This reduces the likelihood that a real target may go undetected, but it may result in a volume of candidate target tracks that overwhelm the target tracker. A compromise setting for the threshold may delay the formation of a target track.

Thus, there is a need for a system for forming high quality target tracks rapidly that does not report a significant number of false tracks and avoids being overloaded with false detections.

SUMMARY

Aspects of embodiments of the present disclosure are directed toward a system for tracking targets. A sequence of sensor observations is processed with two thresholds, including a first threshold, and a second threshold, higher than the first threshold. Signals that exceed the first threshold are identified as low-confidence target detections and stored for possible future use. When a signal exceeds the higher second threshold, it is identified as a high-confidence detection, and one or more candidate tracks are formed, including the high-confidence detection and one or more low-confidence detections from within a neighborhood of the high-confidence detection.

According to an embodiment of the present invention there is provided a method for tracking targets by a system including one or more sensors configured to generate sensor observations and a processing circuit, the method including: identifying, by the processing circuit, in each of a first sequence of sensor observations, a respective plurality of low-confidence target detections meeting a first threshold, each low-confidence target detection including a target position; storing each of the pluralities of low-confidence target detections; identifying, in a triggering sensor observation obtained after the first sequence of sensor observations, a high-confidence target detection meeting a second threshold, higher than the first threshold; selecting a first subset of the plurality of low-confidence target detections in a neighborhood of the high confidence detection from a first sensor observation preceding the triggering sensor observation; and forming a first target track, the first target track including the high-confidence target detection and a low-confidence target detection of the first subset.

In one embodiment, the method includes iteratively, over a plurality of iterations beginning with a first iteration: selecting, with each iteration, from a sensor observation associated with the iteration, a subset of the low-confidence target detections, the observation associated with the iteration preceding the sensor observation by an amount of time that increases with each iteration, the first subset being the subset selected in the first iteration; updating a target track including the high-confidence target detection and one or more target detections from the subsets; and calculating a quality metric for the target track, until the quality metric exceeds a quality metric threshold.

In one embodiment, the method includes displaying the first target track on a display.

In one embodiment, each low-confidence target detection further includes a target velocity.

In one embodiment, the first subset includes fewer than 0.1% of the low-confidence target detections from the first sensor observation.

In one embodiment, the first subset includes fewer than 1% of the low-confidence target detections from the first sensor observation.

In one embodiment, the neighborhood contains at most 10% of the low-confidence target detections of the first sensor observation.

In one embodiment, the neighborhood contains at most 1% of the low-confidence target detections of the first sensor observation.

In one embodiment, selecting a first subset of the plurality of low-confidence target detections further includes selecting only low-confidence target detections meeting a third threshold, less than the first threshold and greater than the second threshold.

In one embodiment, the method includes: selecting a second subset of the plurality of low-confidence target detections from a second sensor observation preceding the first sensor observation, forming an updated target track, the updated target track including: the high-confidence target detection, a low-confidence target detection of the first subset, and a low-confidence target detection of the second subset.

In one embodiment, selecting a second subset of the plurality of low-confidence target detections includes selecting only low-confidence target detections from within a neighborhood of the low-confidence target detection of the first subset.

In one embodiment, selecting a second subset of the plurality of low-confidence target detections further includes selecting only low-confidence target detections meeting a fourth threshold, less than the first threshold and greater than the second threshold.

In one embodiment, the fourth threshold is less than the third threshold.

According to an embodiment of the present invention there is provided a system, including: a sensor system including a first sensor, and being configured to generate a first sequence of sensor observations; and a processing circuit, configured to: identify, in each of the first sequence of sensor observations, a respective plurality of low-confidence target detections meeting a first threshold, each low-confidence target detection including a target position; store each of the pluralities of low-confidence target detections; identify, in a triggering sensor observation obtained after the first sequence of sensor observations, a high-confidence target detection meeting a second threshold, higher than the first threshold; select a first subset of the plurality of low-confidence target detections in a neighborhood of the high confidence detection from a first sensor observation preceding the triggering sensor observation; and form a first target track, the first target track including the high-confidence target detection and a low-confidence target detection of the first subset.

In one embodiment, the sensor system further includes a second sensor, different from the first sensor, and the sensor system is configured to generate the first sequence of sensor observations using: data from the first sensor, and data from the second sensor.

In one embodiment, the first sensor is an electro-optical sensor.

In one embodiment, the system includes a display, and wherein the processing circuit is further configured to display the first target track on the display.

In one embodiment, each low-confidence target detection further includes a target velocity.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a rapid robust detection decreaser provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
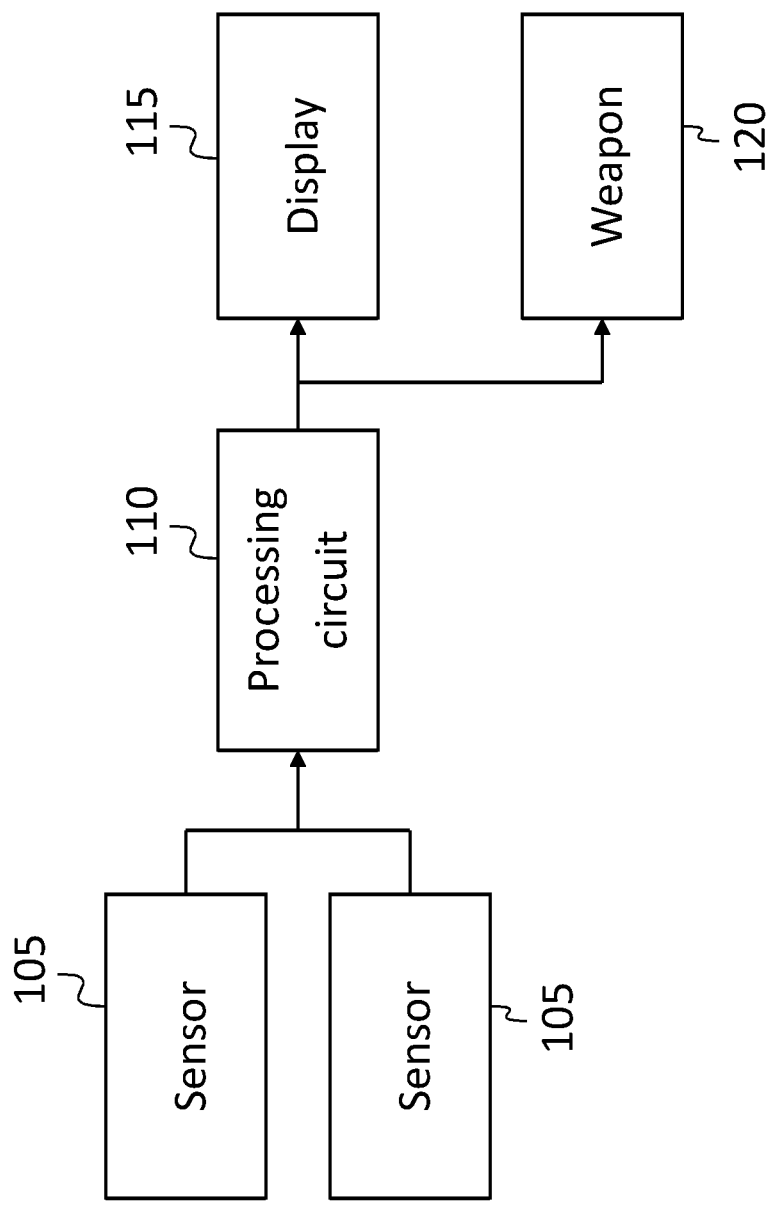
FIG. 1 is a block diagram of a tracking system, according to an embodiment of the present invention.

Referring to FIG. 1, in some embodiments, a target tracking and weapon control system includes a sensor system including one or more sensors 105, a processing circuit 110 (discussed in further detail below), and a display 115, and a weapon 120. The sensors 105 provide sensing information to the processing circuit 110, which generates target tracks, e.g., by fusing sensing information from multiple sensors 105. Tracks of sufficiently good quality (i.e., having confidence levels exceeding a respective track confidence threshold) may be deemed legitimate and reported to or displayed to an operator on the display 115, or sent to the weapon 120, for monitoring or intercepting the target, respectively.

The sensors 105 may be, for example electro-optical sensors or radar sensors. An electro-optical sensor may execute a sequence of exposures, each resulting in a frame of data. The radar may, similarly, perform a sequence of dwells. These data acquisition instances are referred to collectively herein as "sensor observations." Each sensor observation may result in a signal (in analog or digital form) within which there may be true signals (such as bright spots in an optical or infrared image, or bright spots in a radar return) that may be caused by targets (e.g., aircraft, vessels, or vehicles) or by noise or clutter. The sensor extracts metric information from each observation above threshold including some or all of azimuthal position, elevation position, range, and one or more vector components of velocity. In one related art embodiment, each sensor 105 implements a single detection threshold. When the amplitude of a signal (e.g., the brightness of a pixel in an optical or infrared image, or the amplitude of a radar return) exceeds the threshold, the portion of the signal (e.g., the pixel, or the portion of the radar return) that exceeds the threshold is identified as a "detection." The threshold is set sufficiently low to result in an acceptably high probability of detection. The threshold is also set sufficiently high to result in "robust" detections, i.e., detections for which the probability of false alarm is low. When a received signal exceeds the threshold, it is classified as a detection, and the processing circuit 110 attempts to associate the detection with one or more previously initiated candidate target tracks or it initiates a new track based on the metric information associated with the detection. Metric data may be extracted from the observations or a first estimate of metric information may be extracted at the time of observation and a refined estimate extracted when a triggering event occurs and a pre-detection is associated with a robust detection.

The extent of associations that initiate candidate tracks may depend on the assumed kinematic capabilities of the target. A tracker (e.g., a tracker executing in the processing circuit 110) may use at least three or four detections to initiate a track, and may be able to improve the estimated error in the track as it receives additional detections of the same target.

In such an embodiment, if a new frame or dwell is obtained or performed every S seconds, it may therefore take 3-4 S seconds to initiate a track and it may take 6-12 S seconds or longer to ensure the track is real and for errors to converge to a quality of a reportable track. The longest range at which detection occurs may be limited by the signal-to-noise ratio (SNR) of the target. As the detection threshold is reduced, targets may be detected at longer range but with an exponentially increasing number of false alarms. A tracker algorithm can become overwhelmed, forming too many potential combinations of detections into tracks and/or can form many false tracks; to avoid this, detection thresholds may be set around a signal-to-noise ratio of 4 or similar to detect targets at SNR of 6 or higher for EO sensors and 13 dB for radar sensors.

Accordingly, in some embodiments, as discussed in further detail below, the system may use two thresholds, including a first threshold, and a second, higher threshold. The first threshold may be applied to each sensor observation, resulting in the identification of a larger number of low-confidence target detections referred to herein as "pre-detections", which are stored for later use. The confidence in the pre-detections is low because the low first threshold results in a relatively high probability of false alarm. A second, higher threshold is used to identify high-confidence target detections that are referred to herein as "robust detections." Only robust detections trigger the tracker to form candidate tracks; accordingly, a sensor observation containing a robust detection is referred to herein as a "triggering" sensor observation.

The second threshold may be chosen sufficiently high that the tracker is not overwhelmed by the number of detections it tracks. The first threshold may be chosen to be significantly lower than the second threshold, but sufficiently high that storing the detections during some interval of time (e.g., a few minutes) is not unacceptably burdensome. Each detection includes state information for the detection, corresponding to the position and or motion of the target if the detection is not a false detection. The state information may include azimuth and elevation angles for an electro-optical sensor, and, for a radar sensor, azimuth and elevation angles, range, and range rate. The tracker then forms one or more candidate tracks including (i.e., passing through or near) (i) the robust detection and (ii) a plurality of pre-detections from within a neighborhood of the robust detection. The neighborhood from which stored pre-detections are used for subsequent tracking may also be referred to as a "gate". The neighborhood may be chosen to be sufficiently small that it includes only a small fraction of the volume or area covered by the sensor 105, and that, therefore, the number of pre-detections used by the tracker is a small fraction of the pre-detections collected and stored.

The dimension of the neighborhood may depend on the information stored for each stored pre-detection. For example, if a radar sensor that estimates target elevation, azimuth, range, and range rate is used, then for each pre-detection a four-dimensional vector (including target elevation, azimuth, range, and range rate) may be stored, and the neighborhood may be four-dimensional. The tracker may continue to improve the track as it continues to receive detections. Once a track is of sufficient confidence and error level quality, it may be used to aim the weapon at a target position predicted (e.g., extrapolated) from the track, or it may be reported to or displayed, on the display, to an operator.

Each sensor 105 may include a transducer (e.g., a camera or an antenna) and circuitry (including, e.g., amplifiers, mixers, and analog to digital converters), as well as a processing circuit (discussed in further detail below) that may be considered to be a processing circuit of the sensor or, equivalently, to be part of the processing circuit 110 (FIG. 1). Accordingly, any of the operations described above may be performed in the sensor 105, or in the processing circuit 110.

By using more than one threshold the tracking system may be able to form tracks of low error and high confidence earlier than without the benefit of the previously stored detections. In some embodiments the sensor system includes a plurality of sensors 105, and merges the detections from the plurality of sensors 105. In a system with an electro-optical sensor and a radar sensor, for example, it may be that a robust detection in the electro-optical sensor causes the tracker to form candidate target tracks including pre-detections in a neighborhood of the robust detection in the electro-optical sensor, and also including pre-detections in a corresponding neighborhood in the radar sensor.

In a surveillance system, an in-bound target may persist just beyond detection range for a significant period of time, before the target is sufficiently close to produce a signal exceeding the second (higher) threshold. In an illustrative example an electro-optical passive sensor (or any passive sensor) with a signal-to-noise ratio of six can provide robust detections, with a threshold at four times the noise or clutter standard deviation (referred to herein as "sigma") resulting in a probability of detection of approximately 97% and a probability of false alarm of approximately 3E-5. False detections increase geometrically as the detection threshold is lowered and the number of track permutations increases accordingly. For example, when the target is sufficiently far from the sensor system that the signal-to-noise ratio is only four, thresholding to preserve a probability of detection of approximately 97% would increase the probability of false alarm dramatically, to approximately 1.7E-2 (an increase of almost a factor of 1000). This rate of detections may be sufficient to overwhelm the tracker. This example illustrates the difficulties of attempting to establish target tracks earlier by simply lowering the detection threshold.

Figure 2A:
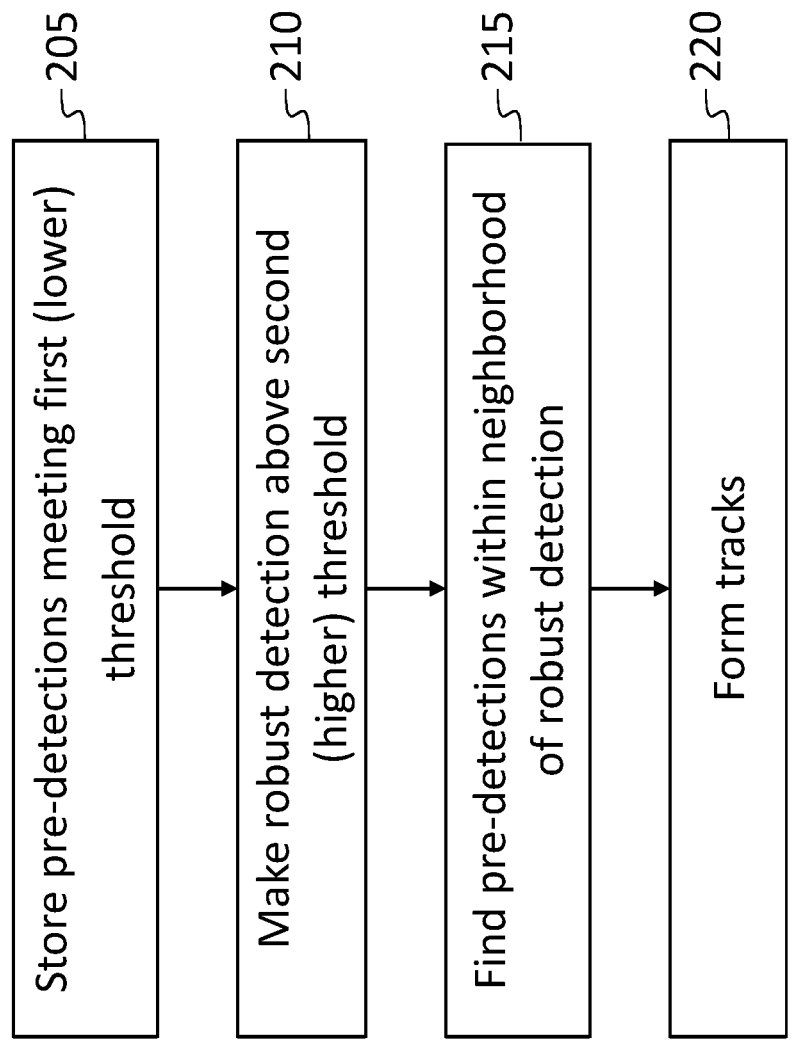
FIG. 2A is a flow chart of a method for tracking, according to an embodiment of the present invention.

Accordingly, referring to FIG. 2A, in some embodiments, data are stored, in an act 205, at the lower first (pre-detection) threshold, which may be, e.g. 2-4 times the noise or clutter standard deviation, on each region of battlespace covered. Target pre-detections are included in the stored data along with a potentially large number of false pre-detections. As mentioned above, feeding all of this data to the tracker would overwhelm the tracker. Once a target is detected, in an act 210, above a second, higher or "robust" threshold, e.g. 4-6 times the noise or clutter standard deviation, the tracker may, in an act 215, find pre-detections within a neighborhood of the robust detection by looking backwards in time using the stored data to form a track. Only stored data points whose positions are close to the robust detection or detections (i.e., within a neighborhood of the robust detection or detections) are fed to the tracker, so that the tracker is not overwhelmed with false pre-detections. A tracker may then, in an act 220, form tracks with known confidence levels and propagate forwards and backwards. In one embodiment, using two or more robust detections to trigger the backwards tracking may make it possible to extrapolate the target's position backwards in time and use stored pre-detections from within a smaller neighborhood of the estimated earlier position of the target. The operations illustrated in FIG. 2A may be performed by a processing circuit 110 external to the sensors 105 and/or by processing circuits internal to the sensors 105.

The tracker may be any of various suitable kinds, which may differ in the way they solve the data association problem. Tracking may be roughly broken up into two parts: data association, and state estimation. Data association is the process of determining which detections to use in forming and maintaining each track, which is intended to represent a single target. State estimation (also called "filtering") is the process of forming a state estimate for each target, referred to as the track state, based on the track's associated detections over time. As used herein, the "state" of a target is the target's position and velocity, and the "track state" is the estimated or hypothetical state of the target as a function of time.

One kind of tracker is a "greedy assignment" tracker, which ranks each potential detection to track assignment for a given time, and assigns detections to tracks sequentially in rank order, without allowing any detection to be used more than once. Another kind of tracker is a nearest neighbor tracker, in which each track associates with its nearest detection, even if this means that multiple tracks associate to the same detection. Another kind of tracker is a global nearest neighbor tracker, in which current detections are assigned to existing tracks via a global cost-minimizing assignment problem, which prevents any detection from being assigned to more than one track. Yet another kind of tracker is a multiple hypothesis tracker, which may use a deferred decision approach, where each track represents a hypothetical sequence of detection-to-track assignments for a single target. In some embodiments of such a tracker, decisions among competing data association hypotheses are not forced at each time (or dwell/frame/look), but instead are retained for the purpose of refining the data association decisions using future data. The same detection may be considered to associate with many hypothetical tracks, but final data association decisions may use each detection in no more than one reported track. In a multiple hypothesis tracker, a branching decision may create two hypothetical tracks from one hypothetical track; one of the two tracks may then be referred to as a "child" track, and the other as a "parent" track. In alternate terminology, both of the two tracks resulting from such a branching decision, as well as other tracks related to the two tracks by earlier or subsequent branching decisions may be referred to as a "family" of tracks, all of which are hypothesized to correspond to a single physical target.

Closure rate and sensor type may dictate how long pre-detections are stored. For example, if a signal-to-noise ratio of six occurs at a one hundred mile range, then the target may be at a signal-to-noise ratio above three at a range of 141 miles for a passive sensor (e.g., an electro-optical (EO) sensor, an infrared (IR) sensor, or a radar warning receiver (RWR)). At 600 mile per hour closing rate the distance changes at a rate of ten miles per minute. Thus the target will persist at a signal-to-noise ratio of three or higher in the stored data from as much as four minutes prior to the first robust detection. Even with a system in which the signal-to-noise ratio is inversely proportional to the fourth power of the range, such as radar, about two minutes of stored pre-detections with at a signal-to-noise ratio of three or higher may be available for use. This implies that for surveillance revisit times of several seconds there may be dozens of stored pre-detections to retrieve for tracking after the first robust detection, and that it may be possible to form a reportable track at the time of the first robust detection.

In an illustrative example in which a megapixel infrared electro-optical sensor is used, the higher threshold may be set at four sigma, so that a robust detection, with a probability of detection of approximately 97% per pixel in which the signal-to-noise ratio is six, and a probability of false alarm of approximately 3E-5. For a megapixel sensor, there may therefore be thirty false detections per frame spread out across the sensor field of view. The tracker may assume that each one of the thirty false detections is a real target until such time as the tracker determines that it is not part of any track.

In one embodiment, all the data points above a lower threshold of 2.5 sigma are stored, resulting in a probability of false alarm or 6.2E-3. For an electro-optical sensor this may involve storing 0.62% of all pixel measurements for some period of time. Assuming a closure rate of 600 miles per hour, and a signal-to-noise ratio of six at a range of one hundred miles, a lower threshold of 2.5 sigma may provide a probability of detection of 95% or better for the target for two minutes of stored data.

If all the data above the lower threshold of 2.5 sigma are stored, there may be 6,200 false pre-detections per frame (at three or four bytes per pre-detection (ten bits each for the x coordinate and the y coordinate, and some additional bits to store the SNR), this may require eighteen to twenty-four Kbytes of memory per sensor frame). The tracker may be incapable of handling this full rate of pre-detection; accordingly robust detection at a much higher threshold may be used, as mentioned above, to reduce the burden on the tracker. If the electro-optical sensor collects thirty frames per second then the volume of data stored may be about 540 Kbytes for a second of data. Storing two minutes' worth of pre-detections would therefore require approximately 65 Mbytes of memory.

In looking backwards, after a robust detection, it is not necessary for the tracker to test all 6,200 pre-detections, as only some of the points will be near (i.e., within the specified neighborhood, or "gate" of) the robust detection. For each robust detection the tracker need only consider a small fraction of the stored data. For example, if the specified neighborhood is a 20×20 pixel region around the robust detection then there may be approximately 2.5 false pre-detections, on average, from each frame of the stored data within the specified neighborhood. Working backwards in time, the tracker may initially identify a number of backwards tracks (e.g., three or four, including a true pre-detection of the target and two or three false pre-detections) corresponding to the several (e.g., three or four) pre-detections, and drop some of the tracks as the tracker works backwards and determines that previous frames lack sufficient pre-detections consistent with these tracks for them to be plausible target tracks. In some embodiments the lower threshold is set higher than 2.5 sigma to further reduce the burden on the tracker during the backwards tracking operation.

As the tracker works backwards in time, it may iteratively update a track (or, if the tracker is a multiple hypothesis tracker, a plurality of hypothetical tracks) using additional date from increasingly earlier sensor observations. As used herein, "updating" a track means modifying a track in response to additional data (e.g., additional data from new observations, or additional data retrieved from past observations). The modifying of the track may include associating new data points with a track and/or updating the state estimate for the track.

Similarly, the pre-detections closest in time preceding a robust detection will have similar signal levels to the robust detection. Thus in one embodiment one or more additional thresholds are applied to select pre-detections to be associated with a robust detection, the additional thresholds being close to the second threshold initially and dropping as frames stored longer ago are tested for pre-detections that could be added to a track.

Figure 2B:
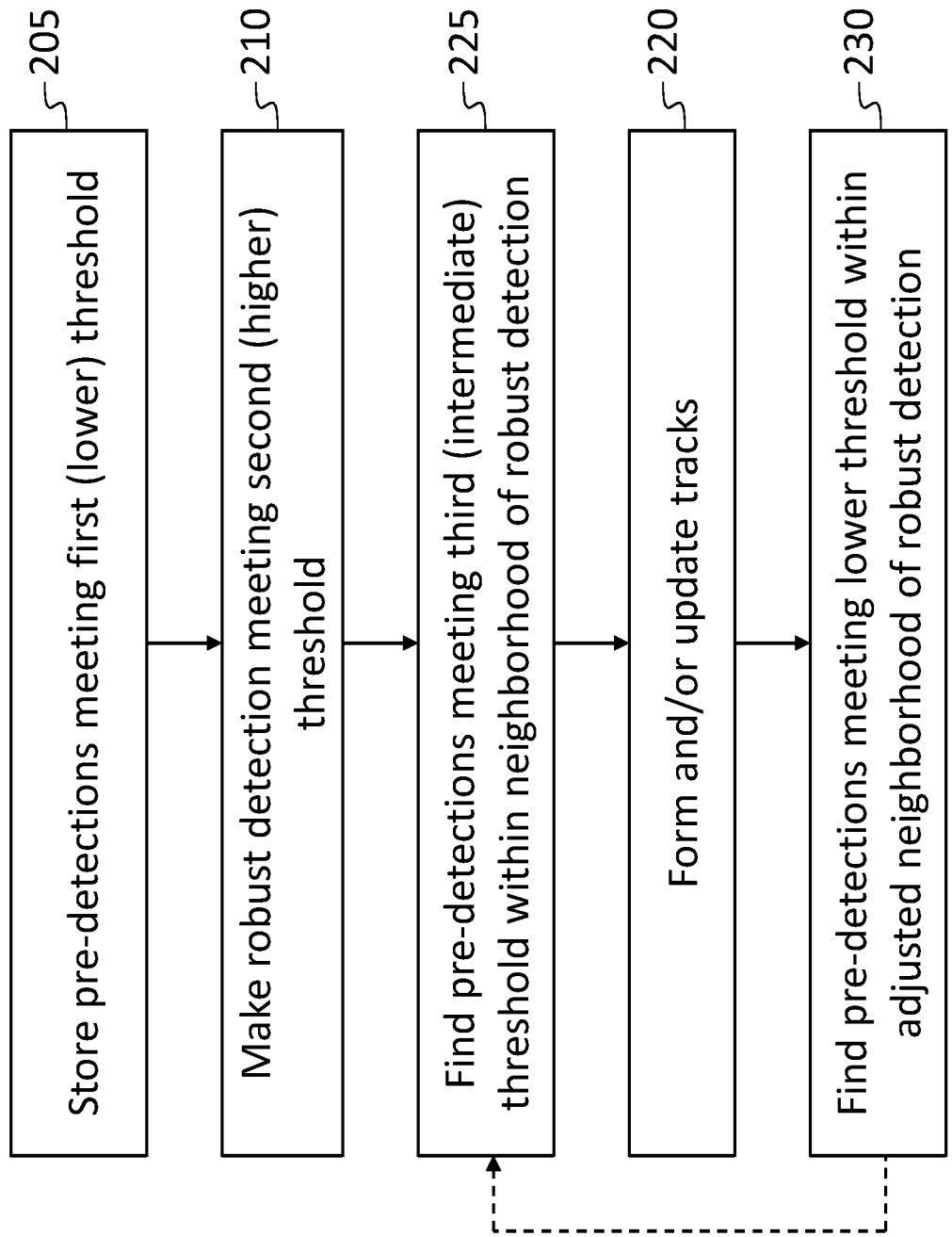
FIG. 2B is a flow chart of a method for tracking, according to an embodiment of the present invention.

Referring to FIG. 2B, the detected signal may abate as the range squared (i.e., it may be inversely proportional to the square of the range) for an electro-optical sensor. If the target is robustly detected at 100 miles range, then, assuming a frame rate of one frame per four seconds, the target was approximately 100.6 miles away (and the target signal had a signal-to-noise ratio of 5.93) for the previous frame. Further, the target range was 101.2 miles in the next earlier frame and less than 102 miles in the frame before that. Even a minute earlier the target range was 110 miles (and the target signal had a signal-to-noise ratio of 4.96). Two minutes earlier the target range was 120 miles (and the target signal had a signal-to-noise ratio of 4.17). The probability of detection may be a function of the difference between (i) the target signal-to-noise ratio, and (ii) the threshold-to-noise ratio (i.e. the ratio of the threshold to the noise or clutter standard deviation). When this difference is 1.66 the probability of detection is 95%; because 4.17-1.66 is 2.51, 2.5 may be used for the lower threshold. The operations illustrated in FIG. 2B may be performed by a processing circuit 110 external to the sensors 105 and/or by processing circuits internal to the sensors 105.

On the first attempt to track the target, the tracker need not use all of the retrieved data. For example, a third, intermediate threshold of 3.3 may be applied, in an act 225, within the neighborhood of the robust detection, such as to the first five frames closest to the robust detection. This threshold has a probability of false alarm of 5E-4. There may therefore be, on average, 500 false pre-detections per frame, at this intermediate threshold, but only 0.1 pre-detections in the 20×20 window. The target may show up, however, with a probability of detection of better than 99%, at the intermediate threshold, in the stored pre-detections in these five frames.

In some embodiments during the backwards tracking process, in an act 230, pre-detections are identified that meet the threshold in an adjusted neighborhood of the robust detection, with the threshold being gradually lowered (forming, e.g., a fourth threshold, a fifth threshold, etc.) as the tracker works backwards in time, and the gate is adjusted, with each successively earlier frame, (as acts 225, 220, and 230 are repeated, as shown by the dashed arrow of FIG. 2B) to include all target positions consistent with all plausible tracks for the target. In this embodiment, the forming of tracks in act 220 may also include updating partially formed tracks by adding detections to them and/or adjusting the estimated or hypothetical target state along the track. In some embodiments, the threshold is gradually lowered until track quality is reached (i.e., until a quality metric calculated for the track exceeds a set threshold) or the compute resources become fully occupied (due to false alarms). As used herein, a "quality metric" is a measure of the likelihood that a track corresponds to a real target, and not to false detections. The quality metric may be a function, for example, of the signal-to-noise ratios of the detections associated with the track, the number of detections associated with the track, and the extent to which the track is consistent with kinematic capabilities of plausible targets.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example a processing circuit may include two processing circuits, an FPGA and a CPU, interconnected on a PWB.

Although limited embodiments of a rapid robust detection decreaser have been specifically described and illustrated herein, many modifications and variations will be apparent to those skilled in the art. Accordingly, it is to be understood that the rapid robust detection decreaser employed according to principles of this invention may be embodied other than as specifically described herein. The invention is also defined in the following claims, and equivalents thereof.

What is claimed is:

1. A method for tracking targets by a system comprising one or more sensors configured to generate sensor observations and a processing circuit, the method comprising:
   obtaining, by the one or more sensors, a first sequence of sensor observations;
   identifying, by the processing circuit, in each of the first sequence of sensor observations, a respective plurality of low-confidence target detections meeting a first threshold, each low-confidence target detection including a target position;
   storing each of the pluralities of low-confidence target detections;
   identifying, in a triggering sensor observation obtained after the first sequence of sensor observations, a high-confidence target detection meeting a second threshold, higher than the first threshold;
   selecting a first subset of the plurality of low-confidence target detections in a neighborhood of the high confidence target detection from a first sensor observation preceding the triggering sensor observation; and
   forming a first target track, the first target track including the high-confidence target detection and a low-confidence target detection of the first subset.

2. The method of claim 1, wherein a sensor of the one or more sensors is an electro-optical sensor.

3. The method of claim 1, further comprising iteratively, over a plurality of iterations beginning with a first iteration:
   selecting, with each iteration, from a sensor observation associated with the iteration, a subset of the low-confidence target detections, the observation associated with the iteration preceding the sensor observation by an amount of time that increases with each iteration, the first subset being the subset selected in the first iteration;
   updating a target track including the high-confidence target detection and one or more target detections from the subsets; and
   calculating a quality metric for the target track, until the quality metric exceeds a quality metric threshold.

4. The method of claim 1, further comprising displaying the first target track on a display.

5. The method of claim 1, wherein each low-confidence target detection further includes a target velocity.

6. The method of claim 1, wherein the first subset includes fewer than 0.1% of the low-confidence target detections from the first sensor observation.

7. The method of claim 1, wherein the first subset includes fewer than 1% of the low-confidence target detections from the first sensor observation.

8. The method of claim 1, wherein the neighborhood contains at most 10% of the low-confidence target detections of the first sensor observation.

9. The method of claim 1, wherein the neighborhood contains at most 1% of the low-confidence target detections of the first sensor observation.

10. The method of claim 9, wherein selecting a first subset of the plurality of low-confidence target detections further comprises selecting only low-confidence target detections meeting a third threshold, the third threshold being an intermediate threshold, between the first threshold and the second threshold.

11. The method of claim 10, further comprising:
selecting a second subset of the plurality of low-confidence target detections from a second sensor observation preceding the first sensor observation,
forming an updated target track, the updated target track including:
the high-confidence target detection,
a low-confidence target detection of the first subset, and
a low-confidence target detection of the second subset.

12. The method of claim 11, wherein selecting a second subset of the plurality of low-confidence target detections comprises selecting only low-confidence target detections from within a neighborhood of the low-confidence target detection of the first subset.

13. The method of claim 11, wherein selecting a second subset of the plurality of low-confidence target detections further comprises selecting only low-confidence target detections meeting a fourth threshold, less than the first threshold and greater than the second threshold.

14. The method of claim 13, wherein the fourth threshold is less than the third threshold.

15. A system, comprising:
a sensor system comprising a first sensor, and being configured to generate a first sequence of sensor observations; and
a processing circuit, configured to:
cause the first sensor to obtain the first sequence of sensor observations;
identify, in each of the first sequence of sensor observations, a respective plurality of low-confidence target detections meeting a first threshold, each low-confidence target detection including a target position;
store each of the pluralities of low-confidence target detections;
identify, in a triggering sensor observation obtained after the first sequence of sensor observations, a high-confidence target detection meeting a second threshold, higher than the first threshold;
select a first subset of the plurality of low-confidence target detections in a neighborhood of the high confidence target detection from a first sensor observation preceding the triggering sensor observation; and
form a first target track, the first target track including the high-confidence target detection and a low-confidence target detection of the first subset.

16. The system of claim 15, wherein the sensor system further comprises a second sensor, different from the first sensor, and the sensor system is configured to generate the first sequence of sensor observations using:
data from the first sensor, and
data from the second sensor.

17. The system of claim 15, wherein the first sensor is an electro-optical sensor.

18. The system of claim 15, further comprising a display, and wherein the processing circuit is further configured to display the first target track on the display.

19. The system of claim 15, wherein each low-confidence target detection further includes a target velocity.

* * * * *